Feb. 24, 1931.  R. T. ROMINE  1,794,121
PORTABLE PLATFORM
Filed July 3, 1926   2 Sheets-Sheet 1
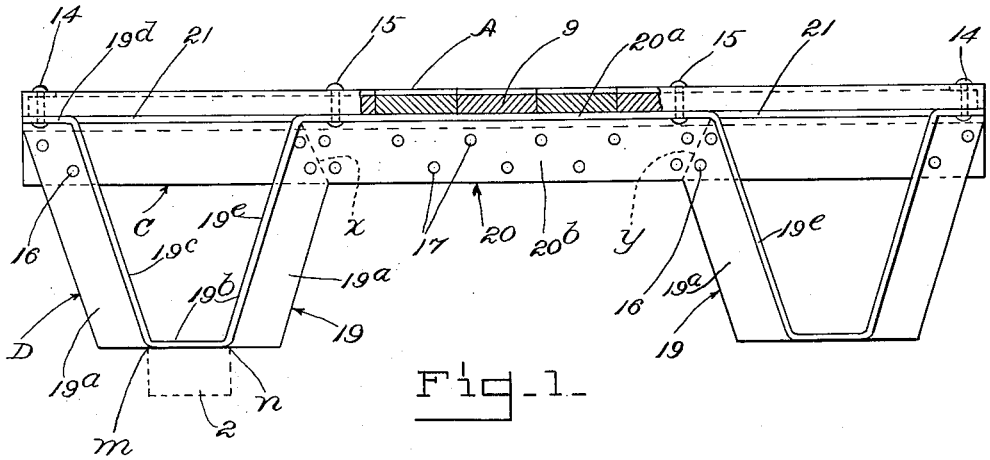
Fig-1-
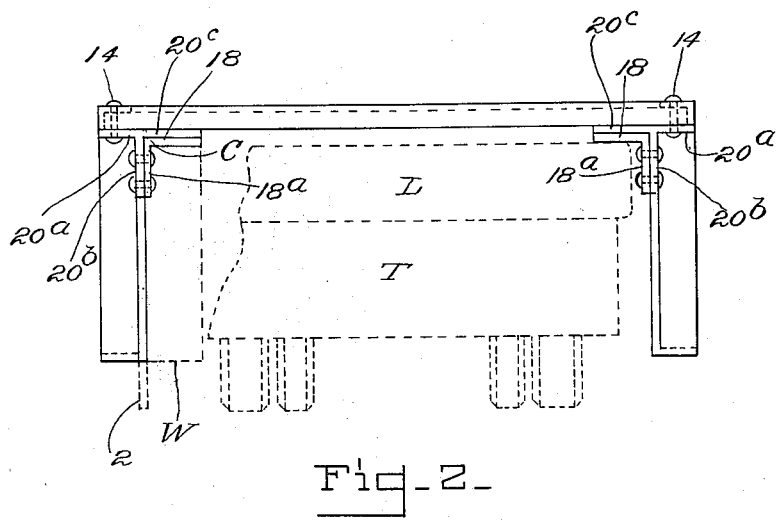
Fig-2-
INVENTOR=
Robert T. Romine
by Macleod, Calver, Copeland & Dike
ATTORNEYS

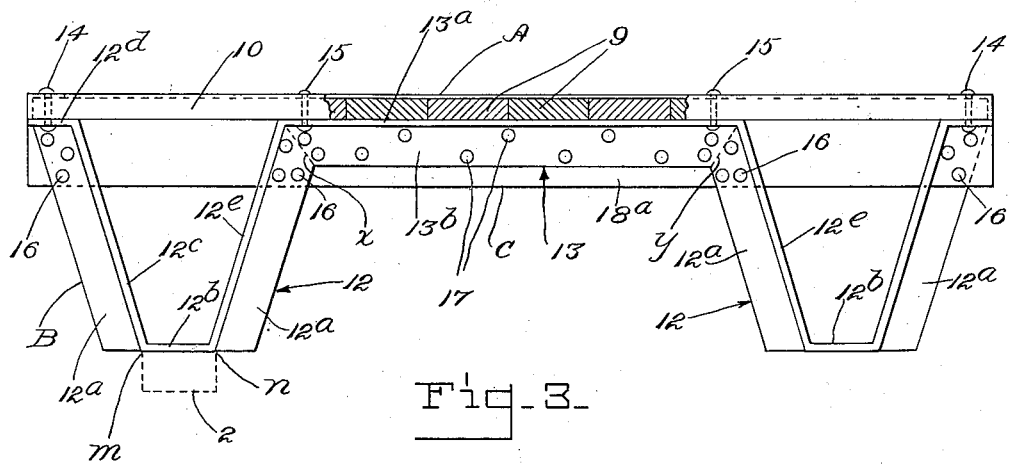//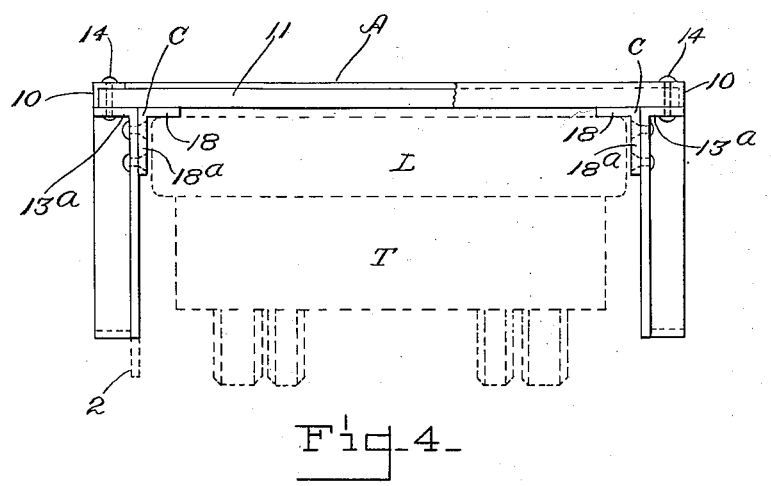

Patented Feb. 24, 1931

1,794,121

UNITED STATES PATENT OFFICE

ROBERT T. ROMINE, OF MOUNT CLEMENS, MICHIGAN

PORTABLE PLATFORM

Application filed July 3, 1926. Serial No. 120,304.

This invention relates to portable platforms especially adapted for use with industrial trucks of the load elevating or lift platform type, wherein the portable platform is constructed to permit the lift platform of the truck to be propelled or introduced into position beneath the floor of the portable platform to lift it and its load.

An object of the invention is to provide an improved portable platform of this class capable of supporting extraordinarily heavy loads, such as ten and fifteen ton loads, and adapted to be lifted and transported by the truck without any tendency of the parts of the platform to break or otherwise become damaged where extraordinarily heavy loads are handled.

A further object of the invention is to provide an improved portable platform having improved means for supporting the same in position to permit a load elevating truck to be propelled beneath the floor of the platform, and in the present instance the supporting means for the platform floor includes a structural bar having legs formed in the length of the bar, as by bending the bar, and in which the legs are so held in position as to prevent collapse or buckling in any direction where very heavy loads such as ten and fifteen ton loads are carried on the platform.

Other objects of this invention will appear in the following description and appended claims, reference being had to the accompanying drawings forming a part of this specification, wherein like reference characters designate corresponding parts in the several views.

In said drawings:

Fig. 1 is a side elevation, partly broken away, showing one form of platform embodying my invention.

Fig. 2 is an end elevation thereof with the lift truck illustrated diagrammatically in position beneath the platform.

Fig. 3 is a side elevation, partly broken away, showing another form of my invention.

Fig. 4 is an end elevation of the construction shown in Fig. 3.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

In the present invention the portable platform in general comprises a suitable floor or platform top formed from a multiplicity of cross members or boards. The platform floor is supported from beneath at each of a pair of opposite undersides thereof by means of a truss including a structural member which may be in the form of a single angle iron bar, such as shown in Figs. 3 and 4, or a double angle iron bar, or T-bar, such as shown in Figs. 1 and 2. A pair of supporting legs for the platform are formed in the length of the structural bar or truss member, so that a strong and rigid structure is provided. In addition to the foregoing construction an angle iron bar is preferably positioned at the inner sides of the legs, and having a vertical flange positioned back to back with portions of the structural bar from which the legs are formed. These vertical flanges provide guide means for the truck when introduced beneath the platform, and the inner angle bars also have inwardly extending horizontal flanges which project into position to receive the upward thrust of the truck. The combined supporting structure or truss enables the platform to be supported with utmost safety, irrespective of the loads placed thereon, and in which the legs are capable of sustaining lateral impacts or blows to which ther are frequently subjected in use.

The portable platform preferably comprises a floor constructed of a multiplicity of cross members or boards 9. These floor boards are protected against wear and collisions around the four side edges thereof by means of a rectangular frame, comprising parallel side angles 10 and transverse angle bars 11 at opposite ends of the floor.

Referring to Figures 1 and 2, the floor of the platform in this instance is supported at each of a pair of opposite sides thereof by means of a truss member or bar D, which is in the form of a steel T-bar. The legs 19 are preferably formed within the length of the bar by a bending operation, which may first be accomplished by slitting the central flange or web of the bar at X and Y, and also at M and N, and after the bar has been bent to form the legs the slitted edges X and Y may be welded together.

The T-bar D after being formed or shaped in the manner shown in Fig. 1 comprises a pair of identical legs 19. That portion of each leg after the bending operation, indicated in dotted lines at 2 and W may be burned off or otherwise removed. The portions of the legs indicated by W are the substantially vertically extending portions of the legs which should not have inwardly projecting flanges, since the same would interfere with a lift truck as it passes beneath the platform.

The bar D thus forms a pair of substantially V-shaped legs having projecting flanges 19a terminating at the bottom of the leg, and also having a continuous flange forming a flat supporting foot 19b and upwardly diverging sides 19c and 19e. The upper end of the flange 19c may be slitted at its juncture with the flange 19a, and then bent to provide a flat horizontal flange 19d bearing against the bottom of the floor and secured to the frame 10 by means of a rivet 14.

It will be seen that the legs 19 are connected together by means of an intermediate T-shaped portion 20, which comprises a vertical flange 20b joined to the flanges 19a of the legs at x and y. In addition the T-shaped portion 20 of the truss member comprises an outwardly extending horizontal flange 20a bearing against the bottom of the platform and forming a continuation of the flanges 19e of the legs. Also the portion 20 comprises an inwardly extending horizontal flange 20c which also bears against the bottom of the platform floor and projects into position to receive the upward thrust of the lift platform L of truck T, as shown in Fig. 2.

At the inner side of each bar D is placed an angle iron bar C, having a continuous vertical flange 18a positioned back to back with the flange 20b, and also abutting against the upper portions 19a of the legs. This bar C, forming a part of the supporting truss for the platform, has an inwardly extending flange 18 extending the length of the platform beneath and in engagement with the flange 20c. The webs or flanges 19a of the several legs are riveted at 16 to the flange 18a of the inner angle iron bar, and the intermediate portion 20 of the bar D is also riveted at 17 to the flange 18a.

Referring to Figs. 3 and 4 the platform floor A is constructed in the same manner as above described. A supporting truss is placed beneath the platform floor along each longitudinal side and comprises in this instance a pair of angle iron bars B and C positioned back to back, the outer bar B being bent or otherwise formed to provide in its length a pair of legs 12 similar in construction to the legs 19 previously described. When the bar B is bent to form the legs 12, it is first slitted at x and y and also at m and n. The slitted edges x and y may thereafter be welded together to form integral joints, and the portions of the legs indicated in dotted lines at z may be burned off or otherwise removed. Each leg 12 thus formed from the truss bar B comprises a pair of diverging outwardly extending flanges 12a, and a continuous inner flange forming a flat foot 12b and upwardly diverging sides 12c and 12e. The web or flange 12c of each leg at its upper end where it is joined to the flange 12a thereof may be first slitted and then is bent to form a flat horizontal flange portion 12d which is riveted at 14 to the angle iron frame member 10.

The legs 12 are joined by means of an intermediate horizontal portion 13 in the form of an angle bar, which is provided with an outwardly extending horizontal flange 13a bearing against the bottom of the platform floor and forming a continuation of the flanges 12e of the legs. This intermediate portion 13 of the bar B also provides a vertical flange 13b which is integrally joined at x and y to the flanges 12a.

The inner angle bar C of each truss is positioned with the vertical flange 18a thereof abutting against the flange 13b and also against the upper ends of the legs. This bar C has an inwardly extending flange 18 which overlies the truck platform L and receives the upward thrust thereof. The flanges 12a of the legs are riveted at 16 to the flange 18a, and the intermediate flange 13b is also riveted at 17 to the flange 18a.

From the foregoing it will be seen that I have provided a portable platform having parallel spaced supporting trusses beneath the platform floor along each of a pair of opposite sides thereof, each truss constructed to support the platform in position to permit the lift platform of the truck to be introduced beneath the platform. Each truss not only provides legs which are braced and strengthened so as to prevent buckling or collapsing, but also provides a guide means for the truck when inserted beneath the platform as well as means for receiving and distributing the upward thrust of the truck platform, thereby enabling the platform to support extremely heavy loads and to be lifted by the truck without any damage to the platform.

What I claim is:

1. In a portable platform the combination of a load supporting floor, a truss extending beneath said floor along each of a pair of opposite sides thereof, each truss comprising a bar bent to form a pair of spaced legs and an angle bar at the inner side of said first bar and having an inwardly extending flange in position to receive the upward thrust of a truck platform.

2. In a portable platform the combination of a load supporting floor, a truss extending beneath said floor along each of a pair of opposite sides thereof, each truss comprising a T-shaped bar bent to form a pair of spaced legs and an angle bar at the inner side of said first bar and having an inwardly extending flange in position to receive the upward thrust of a truck platform.

3. In a portable platform the combination of a load supporting floor, means for supporting said floor at each of a pair of opposite undersides thereof to permit a lift truck to be introduced beneath the floor, each supporting means comprising a continuous structural bar having legs formed in the length of the bar, said bar also having an extension intermediate the legs providing a vertical flange and a horizontal flange bearing against the bottom of the floor, and an angle bar secured to the inner side of said vertical flange in position to guide a lift truck and receive the upward thrust thereof.

4. In a portable platform the combination of a load supporting floor, means for supporting said floor at each of a pair of opposite undersides thereof to permit a lift truck to be introduced beneath the floor, each supporting means comprising a continuous structural bar having legs formed in the length of the bar, said bar also having an extension intermediate the legs providing a vertical flange, and a pair of outwardly and inwardly extending horizontal flanges bearing against the bottom of the floor, and an angle bar having a vertical flange abutting against said vertical flange and also having a horizontal flange abutting against said inwardly extending horizontal flange.

5. In a portable platform the combination of a platform floor, a single bar shaped to form in its length a pair of spaced substantially U-shaped leg supports joined by means of an intermediate extension of said bar bearing against the bottom of the floor at each of a pair of opposite sides thereof, and a bar secured to the inner side of said first bar and comprising united right angle portions forming respectively a guide for a lift truck and means for receiving the upward thrust thereof.

6. In a portable platform, a load supporting floor, a truss extending beneath said floor along each of a pair of opposite sides thereof, each truss comprising a pair of structural iron bars, one of said bars in part of its length being bent to form a leg support, and said bars having vertical flanges back to back at opposite sides of the platform.

7. In a portable platform, a load supporting floor, a truss extending beneath the floor along each of a pair of opposite sides thereof, each truss comprising a pair of structural bars, one of the bars of each truss in part of its length having a vertical flange positioned back to back with the other part of the truss, and in another part of its length being deflected away from and below the floor and then back to the floor to provide a leg, the other bar extending across the leg at said deflected portion.

8. In a portable platform, a load supporting floor, means for supporting said floor at each of a pair of opposite undersides thereof to permit a lift truck to be introduced beneath the floor, each supporting means comprising a continuous bar angular in cross section extending in part of its length along the underside of the floor in supporting engagement therewith, and in another part of its length deflected downwardly entirely away from the floor to provide a leg.

9. In a portable platform, a load supporting floor, means for supporting said floor at each of a pair of opposite undersides thereof to permit a lift truck to be introduced beneath the floor, each supporting means comprising a continuous bar angular in cross section extending in part of its length along the underside of the floor in supporting engagement therewith, and in another part of its length extending downwardly entirely away from the floor to provide a leg, and a bar connected to said first bar and supporting the floor opposite said leg.

In testimony whereof I affix my signature.

ROBERT T. ROMINE.